United States Patent
Cody et al.

(10) Patent No.: US 9,273,965 B2
(45) Date of Patent: Mar. 1, 2016

(54) METHOD FOR DETERMINING FUTURE POSITION BOUNDARY FOR A MOVING OBJECT FROM LOCATION ESTIMATES

(71) Applicant: RAYTHEON COMPANY, Waltham, PA (US)

(72) Inventors: Mac Allen Cody, Richardson, TX (US); Heidi Jean Kruesi, State College, PA (US); Robert James Cole, Pennsylvania Furnace, PA (US); Richard Matthew Wright, Spruce Creek, PA (US)

(73) Assignee: Raytheon Company, Waltham, MA (US)

( * ) Notice: Subject to any disclaimer, the term of this patent is extended or adjusted under 35 U.S.C. 154(b) by 116 days.

(21) Appl. No.: 14/171,649

(22) Filed: Feb. 3, 2014

(65) Prior Publication Data
US 2015/0219459 A1   Aug. 6, 2015

(51) Int. Cl.
*G01C 21/00* (2006.01)

(52) U.S. Cl.
CPC ....... *G01C 21/00* (2013.01); *G06T 2207/20076* (2013.01)

(58) Field of Classification Search
CPC ................. G01C 21/00; G06T 2207/20076
See application file for complete search history.

(56) References Cited

U.S. PATENT DOCUMENTS

2006/0114157 A1\* 6/2006 Kolanek et al. ............... 342/424
2008/0070572 A1\* 3/2008 Shkedi ........................ 455/435.1
2014/0375493 A1\* 12/2014 Weisenburger et al. ... 342/357.3

OTHER PUBLICATIONS

Unknown Author, Implicit Functions, 2003, Dartmouth College, Department of Math.\*

\* cited by examiner

*Primary Examiner* — Calvin Cheung
*Assistant Examiner* — Thomas Ingram
(74) *Attorney, Agent, or Firm* — Lewis Roca Rothgerber Christie LLP

(57) ABSTRACT

A method for estimating a boundary for a future location of a moving object includes: receiving location information about two previous locations of the moving object represented by a first and a second elliptical error probabilities (EEPs); representing each of the EEPs as a conic section via an implicit quadratic equation; defining four tangent lines from the implicit quadratic equation, each tangent line being tangent to both of the EEPs; determining two transverse tangent lines from the four tangent lines; forming a cone in a direction from the first EEP to the second EEP from the two transverse tangent lines; and estimating the boundary of the future location of the moving object as a first side of the cone formed by a first transverse tangent line and a second side of the cone formed by a second transverse tangent line, of the two transverse tangent lines.

14 Claims, 5 Drawing Sheets

US 9,273,965 B2

METHOD FOR DETERMINING FUTURE POSITION BOUNDARY FOR A MOVING OBJECT FROM LOCATION ESTIMATES

FIELD OF THE INVENTION

The present invention relates generally to location estimation; and more particularly to a method for determining future position boundary for a moving object from location estimates.

BACKGROUND

Typically, position/location estimates include some errors. For example, RF trilateration methods use estimated ranges from multiple receivers to estimate the location of an object. RF triangulation uses the angles at which the RF signals arrive at multiple receivers to estimate the location of the object. However, many obstructions, such as barriers, clouds, landscape objects, and the like can distort the estimated range and angle readings leading to varied qualities of location estimate. Estimation-based locating is often measured in accuracy for a given confidence level. In other words, how frequently an observed interval contains the desired parameter is determined by the confidence level (confidence coefficient). More specifically, if confidence intervals are constructed across many separate data analyses of repeated (and possibly different) experiments, the proportion of such intervals that contain the true value of the parameter will match the confidence level.

A confidence region is a multi-dimensional generalization of a confidence interval, that is, a set of points in an n-dimensional space, which is often represented as an ellipsoid around a point which is an estimated solution to a problem, for example, a set of location estimates. In a two-dimensional space, confidence region is represented as an ellipse. The confidence region is calculated in such a way that if a set of measurements were repeated many times and a confidence region calculated in the same way on each set of measurements, then a certain percentage of the time, on average the confidence region would include the point representing the "true" values of the set of variables being estimated, for example, a set of location estimates. Such an elliptical confidence region is conventionally referred to as an elliptical error probability (EEP).

Current position estimation approaches do not predict a future position of a moving object. Instead, they typically only provide a point estimate of the location along with parameters of an EEP at a particular level of confidence (e.g. 95%).

Moreover, in many situations, it is impractical to directly observe where a moving object is and to where it may be traveling.

Accordingly, there is a need for a method for determining the future position boundary of a moving object, which utilizes the already determined two previous location estimates. Each of the two previous location estimates being represented by an elliptical error probability (EEP).

SUMMARY

In some embodiments, the computer implemented method of the present invention capitalizes upon geo-located signal (e.g., RF, sonar, radar, and the like) emissions generated by a moving object, and certain assumptions, to establish the spatial bounds within which the moving object may be traveling. Geolocation of signal emissions, usually derived from signals sources, is a well-established capability. It provides, with a level of confidence, a knowledge of where the emitter of a signal is located. The present invention provides a new capability to establish the spatial bounds, with a level of confidence, for where a moving signal emitter may be going, based upon its geo-located signal emissions that are received over time. This provides useful information for target tracking and pattern-of-life analysis of moving signal emitters (objects) for a variety of applications, such as Activity Based Intelligence and data fusion applications.

In some embodiments, the present invention is a computer implemented method for estimating a boundary for a future location of a moving object. The method includes: receiving location information about two previous locations of the moving object represented by a first and a second elliptical error probabilities (EEPs); representing each of the first and the second EEPs as conic sections via implicit quadratic equations; defining four tangent lines from the implicit quadratic equations, each tangent line being tangent to both of the first and the second EEPs; determining two transverse tangent lines from the four tangent lines; forming a cone in a direction from the first EEP to the second EEP from the two transverse tangent lines; and estimating the boundary of the future location of the moving object as a first side of the cone formed by a first transverse tangent line and a second side of the cone formed by a second transverse tangent line, of the two transverse tangent lines.

In some embodiments, the present invention is a tangible computer storage medium having stored therein computer instructions. The computer instructions when executed by one or more computers perform: receiving location information about two previous locations of the moving object represented by a first and a second elliptical error probabilities (EEPs); representing each of the first and the second EEPs as conic sections via implicit quadratic equations; defining four tangent lines from the implicit quadratic equations, each tangent line being tangent to both of the first and the second EEPs; determining two transverse tangent lines from the four tangent lines; forming a cone in a direction from the first EEP to the second EEP from the two transverse tangent lines; and estimating the boundary of the future location of the moving object as a first side of the cone formed by a first transverse tangent line and a second side of the cone formed by a second transverse tangent line, of the two transverse tangent lines.

The cone then may be superimposed over a map to visualize the bounds for the probable future location of the moving object.

DETAIL DESCRIPTION

Figure 1:
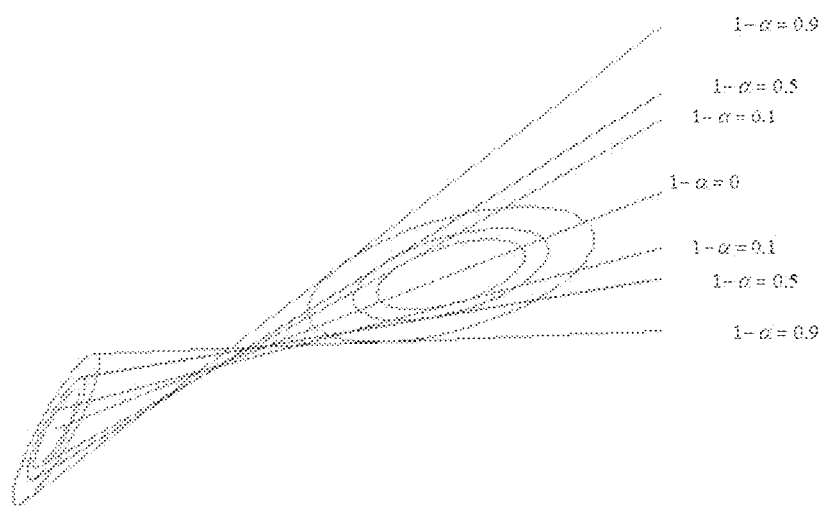
FIG. 1 shows spatial bounds of the straight line travel at different confidence levels, according to some embodiments of the present invention.

Although the present invention is described in the context of a computer executable code, one skilled in the art would recognize that the invention may be implemented as software for a general purpose computer, firmware for the special purpose computer, or a combination thereof. In some embodiments, the present invention determines the spatial bounds at a given confidence level, in which a moving object (such as ships, aircrafts, land vehicle, and the like) might exist at future times from a pair of given location estimates in the form of confidence ellipses, under the assumption of constant speed and straight line motion. Such bounds are expected to resemble a "hurricane track", as shown in FIG. 1. In FIG. 1, the pairs of lines denote position bounds at varying levels of confidence $(1-\alpha)$, with the innermost pair being actually a single line connecting the center of the two ellipses.

Figure 7:
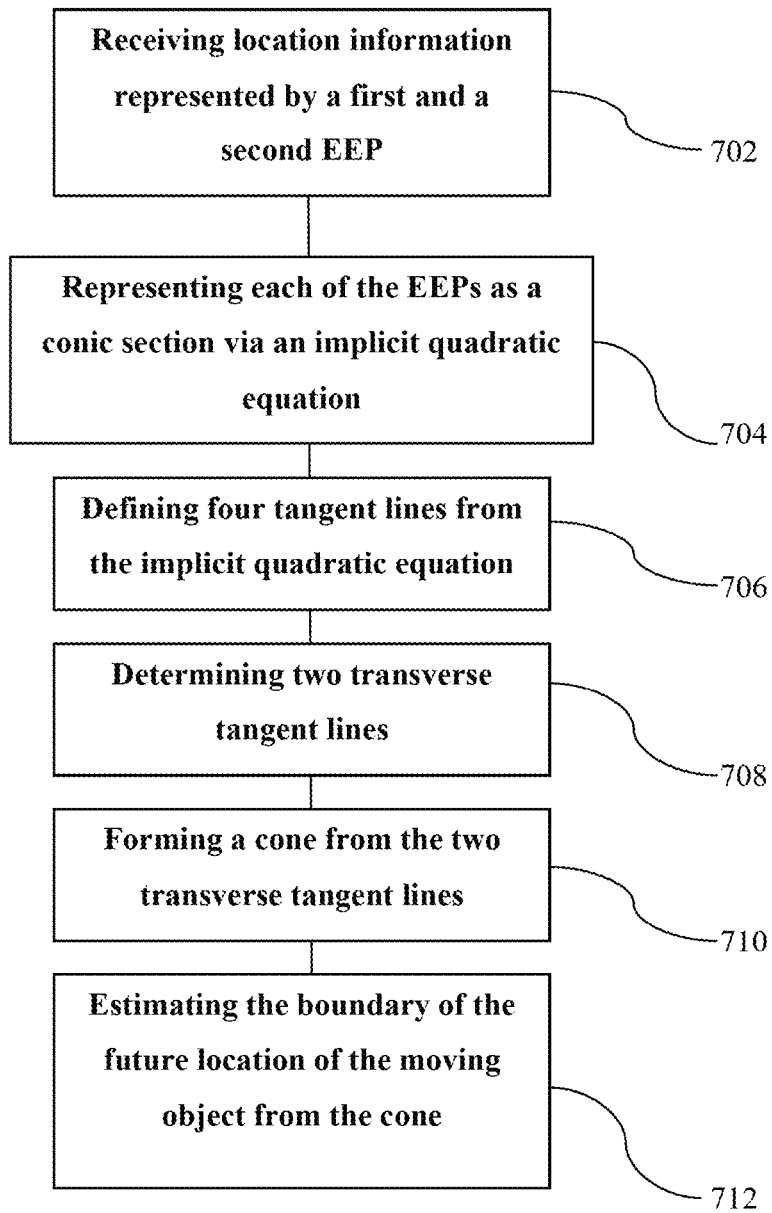
FIG. 7 is an exemplary process flow, executed by one or more computers, according to some embodiments of the present invention.

FIG. 7 is an exemplary process flow for estimating a boundary for a future location of a moving object, executed by one or more computers, according to some embodiments of the present invention. A shown in block 702, location information about two previous locations (or a previous and a current location) of the moving object is received. This information is represented by a first elliptical error probability (EEP) and a second EEP. Each of the EEPs may be represented by a centroid, a semi-major axis, a semi-minor axis, and a rotation angle. Each EEP includes a mean location in the form of a two dimensional vector in latitude/longitude and a covariance matrix. In block 704, each of the first and the second EEPs is represented in a quadratic form. This is accomplished by converting the parameters of the EEP to parameters of the quadratic form using well-known conversion formulas. The mathematical derivation of how an ellipse's characteristics are converted to the parameters for the corresponding conic section, i.e. the parameters (a, b, c, d, e, & f) of the quadratic equation is described in Appendix A, the entire content of which is hereby expressly incorporated by reference.

In block 706, four tangent lines that are tangent to both of the EEPs are defined, from the implicit quadratic equations. Two of the four tangents, known as direct tangential lines, do not provide the desired maximally divergent boundary lines. The other two tangent lines known as transverse tangential lines are of interest. The two traverse tangent lines between the two EEPs provide the maximum angle formed by a vector passing from the first EEP to the second EEP. Each tangent line has two points, for example, $(x_1, y_1)$ and $(x_2, y_2)$ that lie on the first and second EEPs, respectively. These four unknowns $x_1, y_1, x_2, y_2$, can be solved by four equations that specify these four unknowns. In block 708, the two transverse tangent lines are determined from the four tangent lines.

In some embodiments, the direct and transverse tangents are identified by using the knowledge that each pair of tangent points constitutes the end points of a line segment. Thus, for any two line segments to represent transverse tangential lines, they must cross each other. Line crossing can be detected when each tangent point of a tangent line falls on an opposite sides of the line it supposedly crosses. This can be determined through the two-dimensional cross product between the line, as defined by and $(x_1, y_1)$ and $(x_2, y_2)$ the point $(x, y)$:

$$(x_2-y_1)(y-y_1)-(y_2-y_1)(x-x_1)$$

If the result is positive, the point is on one side of the line. If the result is negative, the point is on the other side of the line. If the result is zero, the point is on the line. This test is performed for each tangent line using another tangent line to determine whether they cross each other. Those tangent lines that successfully pass the test are placed in a list. Nominally, there should be two transverse tangent lines in the list.

A cone is then formed in a direction from the first EEP to the second EEP, from the two transverse tangent lines, in block 710. This is done by constructing a cone whose vertex corresponds to the point of intersection of the tangents and whose sides are the tangent line segments contacting the second EEP. In block 712, the boundary of the future location of the moving object is estimated, for example, by superimposing the cone formed in block 710 over a map. This allows a human operator to visualize the potential future location of the moving object.

Figure 2:
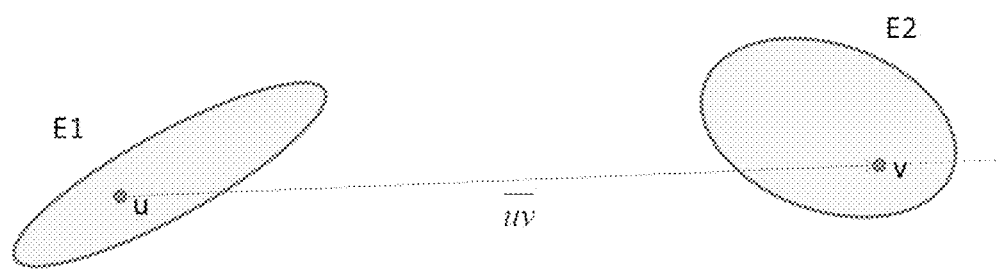
FIG. 2 depicts one possible trajectory of a moving object from a first ellipse to a second ellipse, according to some embodiments of the present invention.

FIG. 2 shows one possible trajectory of a moving object from a first ellipse to a second ellipse, according to some embodiments of the present invention. Under the well-known Bonferroni joint estimation approach, for a confidence level of $1-\alpha$, a confidence level of $1-\alpha/2$ is required for each location estimate. Consider the $(1-\alpha/2)$-level confidence ellipse E1 for a first location 1 and the $(1-\alpha/2)$-level confidence ellipse E2 for a second location 2, that the object moves to, after the location 1. By assumption, the moving object's future trajectory can result from the combination of any point u in E1 and any point v in E2, shown as a dashed line in FIG. 2.

Figure 3:
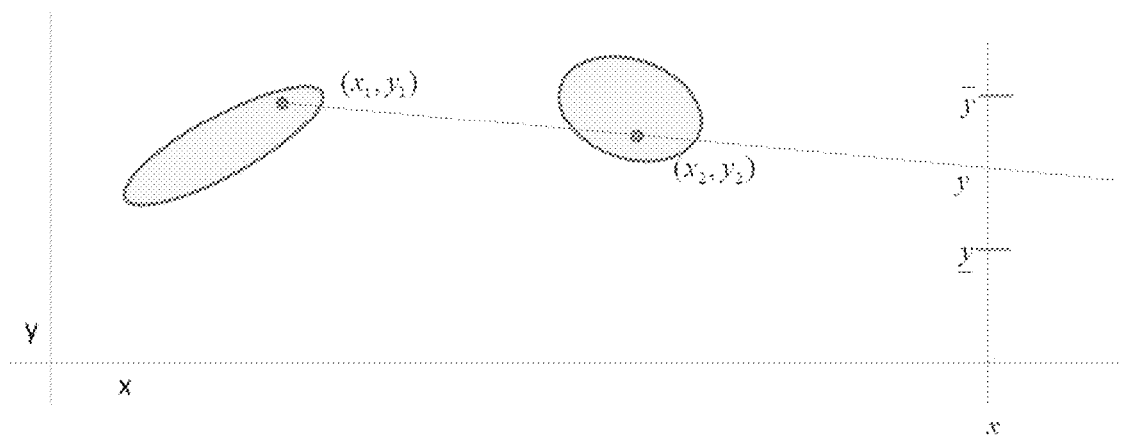
FIG. 3 shows two error ellipses and an interconnecting path within a Cartesian coordinate system, according to some embodiments of the present invention.

FIG. 3 shows two error ellipses and an interconnecting path within a Cartesian coordinate system, according to some embodiments of the present invention. Consider a point $(x_1, y_1)$ in E1 and a point $(x_2, y_2)$ in E2 and the point y where the corresponding heading intersects the line x. Now, for a particular value of x, the solution corresponding to the maximum and minimum values of y comprises of the two y values that correspond to the limits of headings intersecting the line x. Denoting these extreme y values $\bar{y}$ and for the lower and upper limit, respectively, the problem is thus formulated as follows:

$$\underline{y} = \min_{\substack{(x_1,y_1)\in E1 \\ (x_2,y_2)\in E2}} y$$

$$\bar{y} = \min_{\substack{(x_1,y_1)\in E1 \\ (x_2,y_2)\in E2}} y$$

The general, implicit form of an ellipse is given by $ax^2+bxy+cy^2+dx+ey+f=0$ subject to the constraint $b^2-4ac<0$.

Note that this representation can be obtained by the more familiar mean-covariance representation at confidence level $\kappa$ having parameters:

$$\mu = \begin{bmatrix} x_0 \\ y_0 \end{bmatrix}$$

$$\rho = \begin{bmatrix} \rho_{11} & \rho_{12} \\ \rho_{12} & \rho_{22} \end{bmatrix}$$

via the following
$a=\rho_{22}$
$c=\rho_{11}$
$b=2\rho_{12}$
$d=2(\rho_{12}y_0-\rho_{22}x_0)$
$e=2(\rho_{12}x_0-\rho_{11}y_0)$ $$f = \kappa(\rho_{12}^2 - \rho_{11}\rho_{22}) + \rho_{22}x_0^2 + \rho_{11}y_0^2 - 2\rho_{12}x_0y_0$$

where µ a represents the ellipse center and p represents the ellipse covariance.

Figure 4:
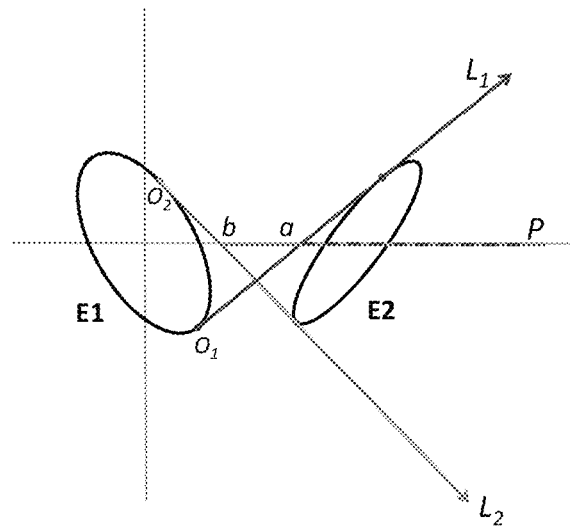
FIG. 4 depicts boundaries of probable straight-line path of a moving object travelling through two ellipses, according to some embodiments of the present invention.

Next, the invention, finds traverse tangents from the maximal angles. FIG. 4 depicts boundaries of probable straight-line path of a moving object travelling through two ellipses, according to some embodiments of the present invention. A positional error ellipse indicates the iso-density of a bivariate normal probability density function for the location of the object. Let a moving object travel on a vector starting somewhere within error ellipse E1 and passing through error ellipse E2, as illustrated in FIG. 4. Let E1 be an ellipse centered at the origin of a coordinate system and rotated by some arbitrary amount. Let E2 be another ellipse offset from the origin by some arbitrary amount, with its center on the x axis and also rotated by some arbitrary amount. The probable vector of the moving object will lie between two extrema that are bounded by all possible vectors that start from E1 and passing through E2. It is desired to find the maximum values for angle $PL_1$ (with vertex at a) and angle $PL_2$ (with vertex at b) as these represent the maximum headings under which an object at those points could be moving.

It would appear that the intersect points of the confidence vectors on the surfaces of the error ellipses must be tangential in order to provide the maximum extent of deviation of the confidence vectors. A proof of this is provided below.

Figure 5:
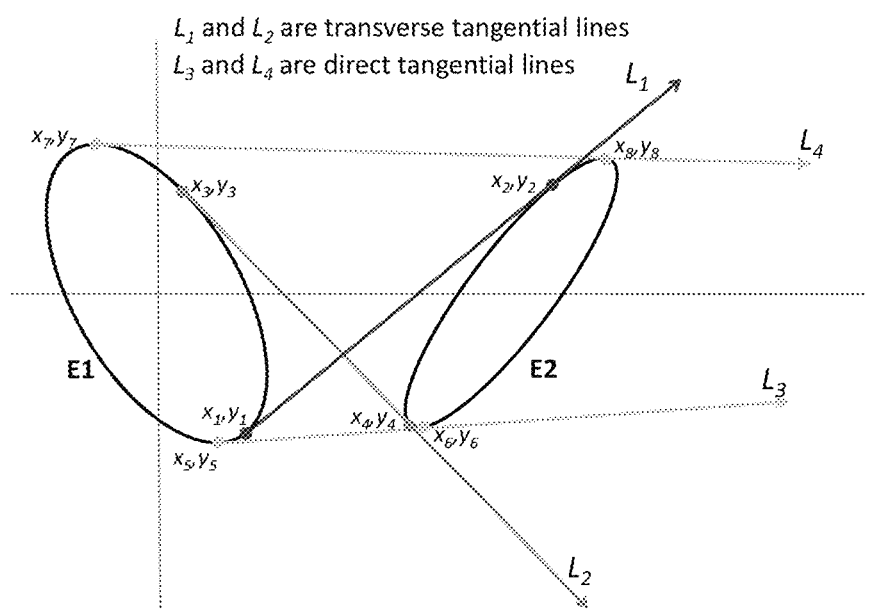
FIG. 5 shows four tangential lines between two ellipses, according to some embodiments of the present invention.

FIG. 5 shows four tangential lines between two ellipses, according to some embodiments of the present invention. In order to derive these two boundaries, the general case of tangent lines between two ellipses are considered, as illustrated in FIG. 5. The lines $L_1$ and $L_2$, which are of interest, are known as transverse tangential lines. The lines $L_3$ and $L_4$ are known as direct tangential lines, which do not provide the desired maximally divergent border lines. Each tangent line has two points, for example, $(x_1, y_1)$ and $(x_2, y_2)$ for line $L_1$, that lie on the ellipses E1 and E2, respectively. The four unknowns, named hereinafter $x_1, y_1, x_2, y_2$, can be solved if four equations can be formulated that specify these four unknowns.

Figure 6:
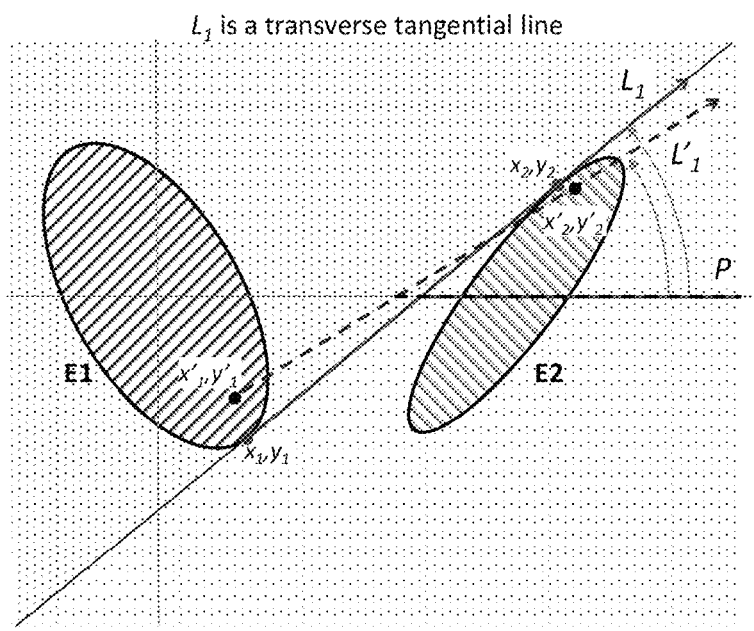
FIG. 6 graphically illustrates that the traverse tangent lines between the two ellipses provide the maximum angle formed by a vector passing from the first ellipse to the second ellipse, according to some embodiments of the present invention.

FIG. 6 graphically illustrates that a traverse tangent line between the two ellipses provide the maximum angle formed by a vector passing from the first ellipse to the second ellipse, according to some embodiments of the present invention. As shown, the centers of two non-intersecting, arbitrarily rotated ellipses E1 and E2 are on a line P. It is desired to show that the maximum divergence angles from P are defined by the transverse tangential lines joining E1 and E2. Note that for clarity, only one of the two transverse tangential lines is shown.

The two-point form of a line can be expressed by the equation shown below:

$$-(y_2 - y_1)x + (x_2 - x_1)y + x_1y_2 - x_2y_1 = 0.$$

A point $(x_n, y_n)$ that is not on the line can be described through inequalities. If the point is to the left of the line, then the inequality is $$-(y_2 - y_1)x_n + (x_2 - x_1)y_n + x_1y_2 - x_2y_1 = 0.$$

If the point is to the right of the line, then the inequality is $$-(y_2 - y_1)x_n + (x_2 - x_1)y_n + x_1y_2 - x_2y_1 = 0.$$

A tangent line that intersects point $(x_1, y_1)$ on ellipse E1 in FIG. 6, forms a bound that all other points on E1 must lie to the left of that line. Likewise, a tangent line that intersects point $(x_2, y_2)$ on ellipse E2 (FIG. 6) forms a bound that all other points on E2 must line to the right of that line. If points $(x_1, y_1)$ and $(x_2, y_2)$ share the same tangent line, then any line $L'_1$ connecting any two points $(x'_1, y'_1)$ and $(x'_2, y'_2)$, in E1 and E2 respectively, must intersect line $L_1$. For $L'_1$ to intersect $L_1$, the slope of $L'_1$ must be different than the slope of $L_1$.

Given the restriction that $(x'_1, y'_1)$ must be in E1 and $(x'_2, y'_2)$ must be in E2, the slope of $L'_1$ must be less than the slope of $L_1$. Therefore, any angle formed by a line $PL'_1$ must be less than the angle formed by $PL_1$, which is then the maximum divergence angle from P. For line $L_2$ in FIGS. 4 and 5, this proof also applies, with the slope of an imagined vector $L'_2$ being greater (less negative) than the slope of $L_2$.

The invention then defines a point on a conic section in order to establish equations that can be solved to find the desired tangents. To obtain the elliptical quadratic form corresponding to an EEP, a point on a conic section needs to be defined. The general, implicit definition for a conic curve is $$ax^2 + bxy + cy^2 + dx + ey + f = 0$$

For the condition $b^2 - 4ac < 0$, the conic curve forms an ellipse. The points $(x_1, y_1)$ and $(x_2, y_2)$ on ellipses E1 and E2, respectively, can then be specified through separate equations for these ellipses.

$$a_1x_1^2 + b_1x_1y_1 + c_1y_1^2 + d_1x_1 + e_1y_1 + f_1 = 0$$

$$a_2x_2^2 + b_2x_2y_2 + c_2y_2^2 + d_2x_2 + e_2y_2 + f_2 = 0$$

Since the desired mover boundaries are within the tangent lines, the tangent lines of the two EEP need to be determined. In order to find the tangent line on any point in the ellipse, implicit differentiation must be performed $$2ax + b\left[y + x\frac{dy}{dx}\right] + 2cy\frac{dy}{dx} + d + e\frac{dy}{dx} = 0.$$

Isolating the differential terms on the left side of the equation yields $$\frac{dy}{dx}[bx + 2cy + e] = -2ax - by - d$$

The equation then becomes $$\frac{dy}{dx} = \frac{-2ax - by - d}{bx + 2cy + e}$$

The tangential line formed by $(x_1, y_1)$ and $(x_2, y_2)$ has the slope $$\frac{y_2 - y_1}{x_2 - x_1}.$$

Therefore, two equations can be stated that relate the slope of the tangent lines on E1 and E2 to the slope of the shared line.

$$\frac{-2a_1x_1 - b_1y_1 - d_1}{b_1x_1 + 2c_1y_1 + e_1} = \frac{y_2 - y_1}{x_2 - x_1}$$

$$\frac{-2a_2x_2 - b_2y_2 - d_2}{b_2x_2 + 2c_2y_2 + e_2} = \frac{y_2 - y_1}{x_2 - x_1}$$

These equations can be reordered, bringing the denominators out from under their respective numerators.

$$(-2a_1x_1-b_1y_1-d_1)(x_2-x_1)=(b_1x_1+2c_1y_1+e_1)(y_2-y_1)$$

$$(-2a_2x_2-b_2y_2-d_2)(x_2-x_1)=(b_2x_2+2c_2y_2+e_2)(y_2-y_1)$$

Multiplying out the terms yields:

$$2a_1x_1^2+b_1x_1y_1+d_1x_1-2a_1x_1x_2-b_1x_2y_1-d_1x_2=b_1x_1y_2+\\2c_1y_1y_2+e_1y_2-b_1x_1y_1-2c_1y_1^2-e_1y_1$$

$$2a_2x_2+b_2x_1y_2+d_2x_1-2a_2x_1^2-b_2x_2y_2-d_2x_2=b_2x_2y_2+\\2c_2y_2^2+e_2y_2-b_2x_2y_1-2c_2y_1y_2-e_2y_1$$

Bringing all terms to the left-hand sides of their equations yields:

$$2a_1x_1^2+2b_1x_1y_1+d_1x_1-2a_1x_1x_2-b_1x_2y_1-d_1x_2-b_1x_1y_2-\\2c_1y_1y_2-e_1y_2+2c_1y_1^2+e_1y_1=0$$

$$-2a_2x_2^2-2b_2x_2y_2-d_2x_2+2a_2x_1x_2+b_2x_1y_2+d_2x_1+b_2x_2y_1+\\2c_2y_1y_2+e_2y_1-2c_2y_2^2-e_2y_2=0$$

The equations derived in the sections above can be brought together to provide four equations with four unknowns.

$$a_1x_1^2+b_1x_1y_1+c_1y_1^2+d_1x_1+e_1y_1+f_1=0 \qquad 4$$

$$a_2x_2^2+b_2x_2y_2+c_2y_2^2+d_2x_2+e_2y_2+f_2=0 \qquad 5$$

$$2a_1x_1^2+2b_1x_1y_1+d_1x_1-2a_1x_1x_2-b_1x_2y_1-d_1x_2-b_1x_1y_2-\\2c_1y_1y_2-e_1y_2+2c_1y_1^2+e_1y_1=0 \qquad 6$$

$$-2a_2x_2^2-2b_2x_2y_2-d_2x_2+2a_2x_1x_2+b_2x_1y_2+d_2x_1+b_2x_2y_1-\\2c_2y_1y_2-e_2y_1+2c_2y_2^2-e_2y_2=0 \qquad 7$$

One approach to solving this system of multivariate polynomial equations is to utilize Groebner bases. This approach has a property, which is germane to the Transverse Tangents approach, called the "elimination property". The elimination property of Groebner bases indicates that the polynomials of Groebner bases describe the indeterminates as a sequence. This allows for the solution of the system of polynomials "variable by variable". Consequently, the Groebner basis of a system of multivariate polynomials can be used to find the solution set for the variables of that system. The Groebner basis of the system of multivariate polynomials has the property that one of the equations is in terms of a single variable. All possible values of that variable then can be easily found, thereby eliminating that equation. A second equation of the Groebner basis is stated in terms of the first variable and a second variable. Given that all possible values of the first variable can be found, all possible values of the second variable can be found also, thereby eliminating that equation as well. Each additional equation that is part of the Groebner basis follows this same form. Consequently, all of the equations are ultimately eliminated and all possible values for all of the variables for the original system of multivariate polynomials can be determined from the Groebner basis of that system.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

APPENDIX A

Ellipse Parameter Conversion to Implicit Form

To convert standard error ellipse parameters (location of central coordinate, radii of semi-major and semi-minor axes, and rotation angle) to the coefficients of the implicit form of a conic section, start with the equation for an ellipse centered on the origin.

$$\frac{x^2}{u^2}+\frac{y^2}{v^2}=1$$

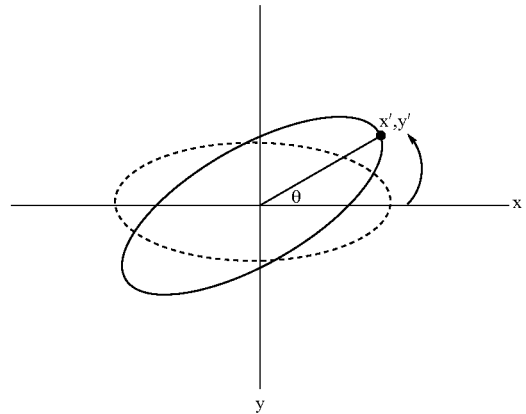

Geometric rotation as applied to a coordinate on an ellipse.

By applying geometric rotation, as illustrated in the above figure, a point on the rotated ellipse (x',y') is represented in the (x,y) coordinate system as $$x=x'\cos\theta+y'\sin\theta, y'\cos\theta-x'\sin\theta$$

Substituting into the equation for an ellipse centered on the origin yields:

$$\frac{(x'\cos\theta+y'\sin\theta)^2}{u^2}+\frac{(y'\cos\theta-x'\sin\theta)^2}{v^2}=1$$

Expanding the equation yields:

$$\frac{x'^2\cos^2\theta+2x'y'\sin\theta\cos\theta+y'^2\sin^2\theta}{u^2}+\\\frac{x'^2\sin^2\theta-2x'y'\sin\theta\cos\theta+y'^2\cos^2\theta}{v^2}=1$$

Bringing the denominators out from under their respective numerators yields:

$$v^2(x'^2\cos^2\theta+2x'y'\sin\theta\cos\theta+y'^2\sin^2\theta)+u^2(x'^2\sin^2\theta-\\2x'y'\sin\theta\cos\theta+y'^2\cos^2\theta)=u^2v^2$$

Expanding the terms yields:

$$v^2x'^2\cos^2\theta-2v^2x'y'\sin\theta\cos\theta+v^2y'^2\sin^2\theta+u^2x'^2\\\sin^2\theta-2u^2x'y'\sin\theta\cos\theta+u^2y'^2\cos^2\theta=u^2v^2$$

Brining all terms to the left-hand side of the equation yields:

$$v^2x'^2\cos^2\theta-2v^2x'y'\sin\theta\cos\theta+v^2y'^2\sin^2\theta+u^2x'^2\\\sin^2\theta-2u^2x'y'\sin\theta\cos\theta+u^2y'^2\cos^2\theta-u^2v^2=0$$

The implicit form of a conic section, including an ellipse, is in the form:

$$ax^2+bxy+cy^2+dx+ey+f=0$$

Reordering the expanded equation into this form yields:

$$(v^2\cos^2\theta+u^2\sin^2\theta)x'^2+2(v^2-u^2)\sin\theta\cos\theta x'y'+(v^2\sin^2\theta+u^2\cos^2\theta)y'^2-u^2v^2=0$$

The coefficients for the implicit form of the rotated ellipse are then:

$$a=v^2\cos^2\theta+u^2\sin^2\theta, b=2(v^2-u^2)\sin\theta\cos\theta, c=v^2\sin^2\theta+u^2\cos^2\theta, d=0, e=0, f=-u^2v^2$$

Translation of any conic section, including an ellipse, involves introduction of offsets into x and y in the form $$(x-h, y-k)$$

The implicit form of the conic section then becomes $$a(x-h)^2+b(x-h)(y-k)+c(y-k)^2+d(x-h)+e(y-k)+f=0$$

Expanding the terms yields:

$$ax^2-2ahx+ah^2+bxy-bkx-bhy+bhk+cy^2-2cky+ck^2+dx-dh+ey-ek+f=0$$

Reordering the expanded equation back into the implicit form of the conic section yields:

$$ax^2+bxy+cy^2+(d-2ah-bk)x+(e-2ck-bh)y+ah^2+bhk+ck^2-dh-ek+f=0$$

This equation can be restated in the form of the original implicit equation:

$$a'x'^2+b'x'y'+c'y'^2+d'x'+e'y'+f'=0$$

Utilizing the coefficients for the rotated ellipse from above, the coefficients for the implicit form of the rotated and translated ellipse are then:

$$a'=a=v^2\cos^2\theta+u^2\sin^2\theta, b'=b=2(v^2-u^2)\sin\theta\cos\theta, c'=c=v^2\sin^2\theta+u^2\cos^2\theta$$

$$d'=d-2ah-bk, e'=e-2ck-bh, f'=ah^2+bhk+ck^2-dh-ek+f$$

The invention claimed is:

1. A computer implemented method for estimating a boundary for a future location of a moving object, the method comprising:
   receiving, by a receiver, location information about two previous locations of the moving object represented by a first and a second elliptical error probabilities (EEPs);
   converting the parameters of each of the first and the second EEPs to parameters of a quadratic form to represent said each of the first and the second EEPs as a conic section via an implicit quadratic equation;
   computing four tangent lines from the implicit quadratic equation, each tangent line being tangent to both of the first and the second EEPs;
   determining two transverse tangent lines from the four tangent lines to provide a maximum angle formed by a vector passing from the first EEP to the second EEP;
   constructing a cone in a direction from the first EEP to the second EEP from the two transverse tangent lines; and
   estimating the boundary of the future location of the moving object as a first side of the cone formed by a first transverse tangent line and a second side of the cone formed by a second transverse tangent line, of the two transverse tangent lines.

2. The method of claim 1, further comprising superimposing the cone over a map to display the future location of the moving object over the map.

3. The method of claim 1, wherein each EEP includes a mean location in the form of a two dimensional vector in latitude and longitude, and a covariance matrix.

4. The method of claim 1, wherein representing each of the EEPs as a conic section via an implicit quadratic equation comprises converting parameters of the EEP to parameters of a quadratic form.

5. The method of claim 1, wherein determining two transverse tangent lines comprises representing each of the four tangent lines by a line segment; and determining line crossing of each tangent line with respect to the other three tangent lines by determining whether each tangent point of a tangent line falls on opposite sides of the line said each tangent line crosses.

6. The method of claim 1, wherein the two traverse tangent lines between the two EEPs provide the maximum angle formed by a vector passing from the first EEP to the second EEP.

7. The method of claim 1, wherein forming a cone comprises constructing a cone whose vertex corresponds to the point of intersection of the two traverse tangent lines and whose sides are the traverse tangent line segments contacting the second EEP.

8. A non-transitory tangible computer storage medium having stored therein computer instructions, the computer instructions when executed by one or more computers perform the following process for estimating a boundary for a future location of a moving object, for which location information about two previous locations of the moving object represented by a first and a second elliptical error probabilities (EEPs) is received:
   representing each of the first and the second EEPs as a conic section via an implicit quadratic equation;
   defining four tangent lines from the implicit quadratic equation, each tangent line being tangent to both of the first and the second EEPs;
   determining two transverse tangent lines from the four tangent lines;
   forming a cone in a direction from the first EEP to the second EEP from the two transverse tangent lines; and
   estimating the boundary of the future location of the moving object as a first side of the cone formed by a first transverse tangent line and a second side of the cone formed by a second transverse tangent line, of the two transverse tangent lines.

9. The non-transitory tangible computer storage medium of claim 8, further comprising computer instructions when executed by one or more computers to perform superimposing the cone over a map to display the future location of the moving object on the map.

10. The non-transitory tangible computer storage medium of claim 8, wherein each EEP includes a mean location in the form of a two dimensional vector in latitude and longitude, and a covariance matrix.

11. The non-transitory tangible computer storage medium of claim 8, wherein representing each of the EEPs as a conic section via an implicit quadratic equation comprises converting parameters of the EEP to parameters of a quadratic form.

12. The non-transitory tangible computer storage medium of claim 8, wherein determining two transverse tangent lines comprises representing each of the four tangent lines by a line segment; and determining line crossing of each tangent line with respect to the other three tangent lines by determining whether each tangent point of a tangent line falls on opposite sides of the line said each tangent line crosses.

13. The non-transitory tangible computer storage medium of claim 8, wherein the two traverse tangent lines between the two EEPs provide the maximum angle formed by a vector passing from the first EEP to the second EEP.

14. The non-transitory tangible computer storage medium of claim 8, wherein forming a cone comprises constructing a cone whose vertex corresponds to the point of intersection of the two traverse tangent lines and whose sides are the traverse tangent line segments contacting the second EEP.

* * * * *